United States Patent
Lee et al.

(10) Patent No.: US 11,835,626 B2
(45) Date of Patent: *Dec. 5, 2023

(54) FABRY-PEROT CAVITY PHASE MODULATOR INCLUDING A TUNABLE CORE, AN OPTICAL MODULATING DEVICE INCLUDING THE SAME, AND A LIDAR APPARATUS INCLUDING THE OPTICAL MODULATING DEVICE

(71) Applicants: SAMSUNG ELECTRONICS CO., LTD., Suwon-si (KR); CALIFORNIA INSTITUTE OF TECHNOLOGY, Pasadena, CA (US)

(72) Inventors: Duhyun Lee, Yongin-si (KR); Muhammad Alam, Pasadena, CA (US); Harry Atwater, Pasadena, CA (US); Ragip Pala, Pasadena, CA (US); Byunghoon Na, Suwon-si (KR); Seunghoon Han, Seoul (KR)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,026

(22) Filed: Sep. 19, 2022

(65) Prior Publication Data
US 2023/0016681 A1    Jan. 19, 2023

Related U.S. Application Data

(60) Division of application No. 16/884,850, filed on May 27, 2020, now Pat. No. 11,513,219, which is a
(Continued)

(30) Foreign Application Priority Data
Nov. 22, 2017   (KR) .................. 10-2017-0156610

(51) Int. Cl.
*G01S 17/02*   (2020.01)
*G02F 1/017*   (2006.01)
(Continued)

(52) U.S. Cl.
CPC .............. *G01S 17/02* (2013.01); *G01S 7/481* (2013.01); *G01S 7/4817* (2013.01);
(Continued)

(58) Field of Classification Search
CPC . G01S 17/02; G01S 7/481; G02F 1/21; G02F 1/01716; G02F 2001/0151; G02F 2001/213
See application file for complete search history.

(56) References Cited

U.S. PATENT DOCUMENTS 4,269,481 A   5/1981   Yeh
4,790,635 A   12/1988  Apsley
(Continued)

FOREIGN PATENT DOCUMENTS

KR   10-2012-0075182 A   7/2012

OTHER PUBLICATIONS

Communication dated Dec. 17, 2021 by the Korean Intellectual Property Office in counterpart Korean Patent Application No. 10-2017-0156610.

*Primary Examiner* — Hwa Andrew Lee
(74) *Attorney, Agent, or Firm* — Sughrue Mion, PLLC

(57) ABSTRACT

Provided are an optical modulating device and a system including the optical modulating device. The optical modulating device includes a substrate, and a phase modulator formed on the substrate and including a Fabry-Perot cavity. The Fabry-Perot cavity of the phase modulator includes a first reflective layer, a second reflective layer, and a tunable core formed between the first reflective layer and the second reflective layer, wherein the tunable core is formed of a (Continued)

semiconductor material and is configured to modulate a phase of light corresponding to modulation of a refractive index of the tunable core according to electrical control.

15 Claims, 8 Drawing Sheets

Related U.S. Application Data continuation of application No. 15/867,015, filed on Jan. 10, 2018, now abandoned.

(60) Provisional application No. 62/444,488, filed on Jan. 10, 2017.

(51) Int. Cl.
| | | |
|---|---|---|
| *G01S 7/481* | (2006.01) | |
| *G02F 1/21* | (2006.01) | |
| *G02F 1/29* | (2006.01) | |
| *G02F 1/015* | (2006.01) | |

(52) U.S. Cl.
CPC ............ *G02F 1/01716* (2013.01); *G02F 1/21* (2013.01); *G02F 1/292* (2013.01); *G02F 1/0151* (2021.01); *G02F 1/213* (2021.01); *G02F 2202/30* (2013.01)

(56) References Cited

U.S. PATENT DOCUMENTS

| | | |
|---|---|---|
| 6,031,653 A | 2/2000 | Wang |
| 7,145,709 B1 | 12/2006 | Westfall |
| 8,492,863 B2 | 7/2013 | Cho et al. |
| 8,804,226 B2 | 8/2014 | Lee et al. |
| 9,195,112 B2 | 11/2015 | Meister |
| 2002/0097771 A1 | 7/2002 | Hwang |
| 2002/0109149 A1 | 8/2002 | Chang |
| 2007/0181810 A1 | 8/2007 | Tan |
| 2012/0162380 A1 | 6/2012 | Cho et al. |
| 2015/0153628 A1 | 6/2015 | Cho et al. |
| 2016/0223723 A1 | 8/2016 | Han et al. |

FABRY-PEROT CAVITY PHASE MODULATOR INCLUDING A TUNABLE CORE, AN OPTICAL MODULATING DEVICE INCLUDING THE SAME, AND A LIDAR APPARATUS INCLUDING THE OPTICAL MODULATING DEVICE

CROSS-REFERENCE TO RELATED APPLICATIONS

This application is a continuation of U.S. application Ser. No. 16/884,850, filed May 27, 2020, which is a continuation of U.S. application Ser. No. 15/867,015, filed Jan. 10, 2018, which claims the priority from U.S. Provisional Application No. 62/444,488, filed on Jan. 10, 2017, in the U.S. Patent and Trademark Office, and Korean Patent Application No. 10-2017-0156610, filed on Nov. 22, 2017, in the Korean Intellectual Property Office, the disclosures of which are incorporated herein in their entirety by reference.

BACKGROUND

1. Field

Example embodiments of the present disclosure relate to an optical modulating device and a system including the same, and more particularly, to an optical modulating device having a Fabry-Perot cavity structure and a system including the optical modulating device.

2. Description of the Related Art

An optical device that modifies transmission or reflection, polarization, phase, intensity, path or the like of incident light is applied to various types of optical apparatuses. In addition, optical modulating devices of various structures have been suggested to control the above properties in an optical system in a desired manner.

For example, liquid crystals having optical anisotropy, a microelectromechanical system (MEMS) structure that uses micro-mechanical movement of light blocking/reflecting elements or the like are widely used in an optical modulating device. Due to the characteristics of a driving method of optical modulating devices, the optical modulating devices may have slower response times of several μs or more.

Recently, attempts have been made to apply a meta structure to optical modulating devices. A meta structure is a structure in which a numerical value less than a wavelength of incident light is applied to a thickness, a pattern, a period, or the like of the meta structure.

SUMMARY

One or more example embodiments provide an optical modulating device that modulates light at a higher speed based on electro-optic characteristics of a semiconductor material and has a higher optical efficiency, and a system including the optical modulating device.

According to an aspect of an example embodiment, there is provided an optical modulating device including a substrate, and a phase modulator formed on the substrate and including a Fabry-Perot cavity, wherein the Fabry-Perot cavity of the phase modulator includes a first reflective layer, a second reflective layer, and a tunable core formed between the first reflective layer and the second reflective layer, wherein the tunable core is formed of a semiconductor material and is configured to modulate a phase of light based on modulation of a refractive index of the tunable core by electrical control of the tunable core.

The tunable core may include a quantum well configured to modulate a phase of light based on the modulation of the refractive index of the tunable core by electrical control.

The tunable core may include a multi-quantum well.

The multi-quantum well may include a Group III-V semiconductor.

The tunable core may include a bulk semiconductor region configured to modulate a phase of light based on the modulation of the refractive index of the tunable core by electrical control.

The optical modulating device wherein at least one from among the first reflective layer and the second reflective layer include a distributed Bragg reflector.

The distributed Bragg reflector of the at least one from among the first reflective layer and the second reflective layer may include a dielectric material, and the Fabry-Perot cavity forms a dielectric tunable core.

The optical modulating device may further include a common electrode between the first reflective layer and the tunable core.

The first reflective layer may be formed on the substrate, the tunable core may be formed on the first reflective layer, the second reflective layer may be formed on the tunable core, and the Fabry-Perot cavity may include a protrusion protruding from the first reflective layer, the protrusion including the tunable core and the second reflective layer.

The second reflective layer may have a size corresponding to the tunable core.

The protrusion may include a plurality of protrusions spaced apart from each other.

The phase modulator may be included in driving units.

The phase modulator may be arranged in a plurality of arrays two-dimensionally and may be configured to form a two-dimensional optical modulator.

The phase modulator may be arranged in a plurality of arrays one-dimensionally and may be configured to form a one-dimensional optical modulator.

The protrusion may further include an additional tunable core formed on the second reflective layer, and a third reflective layer formed on the additional tunable core, wherein the Fabry-Perot cavity has a dual cavity structure.

According to an aspect of another example embodiment, there is provided a light detecting and ranging (LIDAR) apparatus including a light source configured to emit light, the optical modulating device configured to steer light emitted from the light source toward an object, and a sensor configured to receive light that is steered by the optical modulating device toward the object and reflected by the object.

The tunable core may include a quantum well or a bulk semiconductor region that is formed using a Group III-V semiconductor and may be configured to modulate a phase of light corresponding to the modulation of the refractive index of the tunable core according to electrical control.

The at least one from among the first reflective layer and the second reflective layer may include a distributed Bragg reflector, wherein the distributed Bragg reflector includes a dielectric material, wherein the Fabry-Perot cavity forms a dielectric tunable core.

The first reflective layer may be formed on the substrate, the tunable core may be formed on the first reflective layer, and the second reflective layer may be formed on the tunable core, and the Fabry-Perot cavity may include a protrusion protruding from the first reflective layer, the protrusion including the tunable core and the second reflective layer.

The protrusion may further include an additional tunable core formed on the second reflective layer; and a third reflective layer formed on the additional tunable core, wherein the Fabry-Perot cavity has a dual cavity structure.

BRIEF DESCRIPTION OF THE DRAWINGS

The above and/or other aspects will become apparent and more readily appreciated from the following description of the example embodiments, taken in conjunction with the accompanying drawings in which.

DETAILED DESCRIPTION

Figure 1:
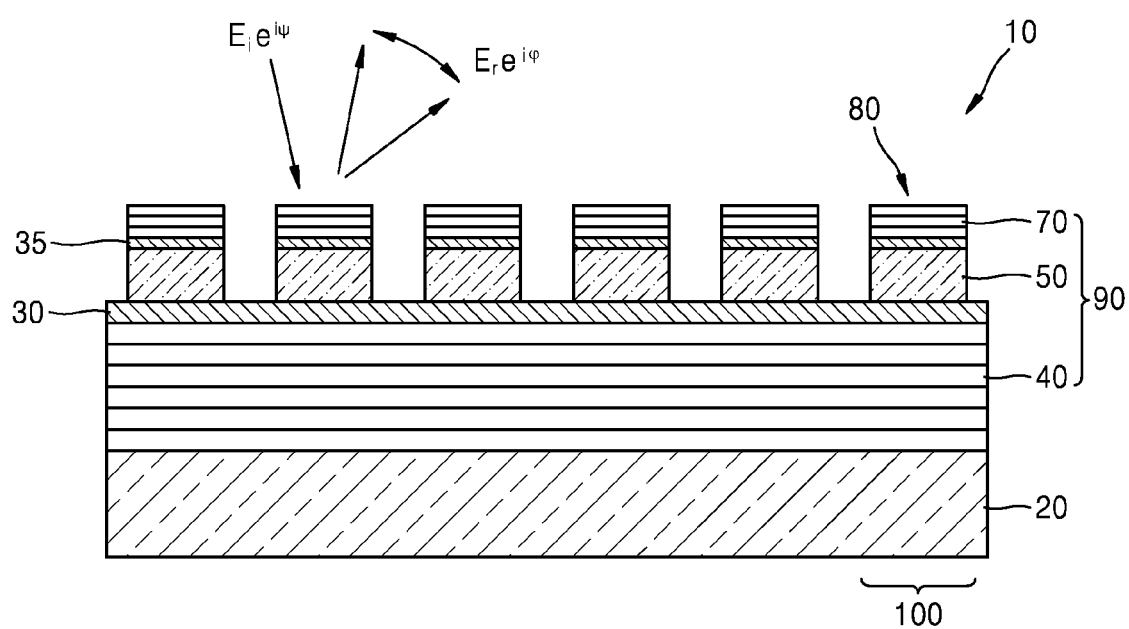
FIG. 1 is a schematic view of an exemplary structure of an optical modulating device according to an example embodiment.

Reference will now be made in detail to example embodiments, examples of which are illustrated in the accompanying drawings, wherein like reference numerals refer to like elements throughout and the thicknesses or sizes of elements may be exaggerated for clarity. In this regard, example embodiments may have different forms and should not be construed as being limited to the descriptions set forth herein.

Hereinafter, when a layer is described as being "above," "on the top of," or "on" another substrate or layer, the layer may be directly on the substrate or the other layer or intervening layers may also be present. As used herein, the term "and/or" includes any and all combinations of one or more of the associated listed items. Expressions such as "at least one of" or "at least one from among," when preceding a list of elements, modify the entire list of elements and do not modify the individual elements of the list.

An optical modulating device according to an example embodiment may include a phase modulator including a Fabry Perot cavity (FPC), and may be configured to modulate a phase of incident light by modulating a refractive index of a tunable core between two reflective layers of the FPC.

In the optical modulating device according to the example embodiment, the tunable core may be formed of a semiconductor material. By modulating a refractive index of the tunable core formed of a semiconductor material, cavities may or may not resonate, and a phase change between 0 to 360 degrees of incident light may be obtained.

The optical modulating devices according to the example embodiment may be applied to various fields such as laser beam steering, scanners, LIDARs, spatial light modulators (SLMs), micro-displays, holography, active optical elements, or high-order diffraction.

FIG. 1 is a schematic view of an exemplary structure of an optical modulating device 10 according to an example embodiment.

Referring to FIG. 1, the optical modulating device 10 may be, for example, a reflective meta-device that includes a substrate 20 and a phase modulator 100 including a Fabry-Perot cavity 90 on the substrate 20. The Fabry-Perot cavity 90 may be patterned to include a first reflective layer 40 and a second reflective layer 70, and a tunable core 50 provided between the first reflective layer 40 and the second reflective layer 70, wherein the tunable core 50 is formed of a semiconductor region such that a refractive index of the tunable core 50 is modulated according to electrical control to modulate a phase of reflected light.

The substrate 20 may be, for example, a semiconductor substrate. The substrate 20 may be, for example, a gallium arsenide (GaAs) substrate. Moreover, other various types of substrates, on which the Fabry-Perot cavity 90 may be formed, may be used as the substrate 20.

The Fabry-Perot cavity 90 of the phase modulator 100 may be configured to modulate a phase of light by modulating a refractive index of the tunable core 50 by electrically controlling the tunable core 50 that includes a semiconductor region. A bias applied to the tunable core 50 may modify a refractive index of the tunable core 50 of the Fabry-Perot cavity 90 and modulate a resonance frequency the Fabry-Perot cavity 90 to modulate a phase of light.

The first reflective layer 40 of the Fabry-Perot cavity 90 may be formed on the substrate 20. The tunable core 50 may be formed on the first reflective layer 40, and the second reflective layer 70 may be formed on the tunable core 50. Here, the first reflective layer 40 may be formed on the substrate 20, and a bottom electrode layer 30 may be formed on the first reflective layer 40. The bottom electrode layer 30 may be used as a common electrode. In addition, the bottom electrode layer 30 may be patterned according to the phase modulator 100.

At least one of the first reflective layer 40 and the second reflective layer 70 may be, for example, a distributed Bragg reflector (DBR). A DBR of at least one of the first reflective layer 40 and the second reflective layer 70 may include a dielectric material. In this case, as the tunable core 50 is also formed of a semiconductor material, the Fabry-Perot cavity 90 may form a dielectric tunable structure.

Example embodiments, which will be described below, illustrate that the first reflective layer 40 and the second reflective layer 70 both include a DBR, but example embodiments are not limited thereto.

One of the first reflective layer 40 and the second reflective layer 70 may have a smaller reflectivity than the other. Light that is coupled into the Fabry-Perot cavity 90 may be output after undergoing a resonance process. A phase of the input light may be modulated according to modulation of a refractive index of the tunable core 50, and may be output through one of the first reflective layer 40 and the second reflective layer 70 that, for example, has a smaller reflectivity than the first reflective layer 40.

Example embodiments, which will be described below, illustrate that both the first reflective layer 40 and the second reflective layer 70 include a DBR, and the second reflective layer 70 has less number of stacked layers than the first reflective layer and has a smaller reflectivity than the first reflective layer 40. However, example embodiments are not limited thereto.

When the second reflective layer 70 has a smaller reflectivity than the first reflective layer 40, the phase-modulated light is output as reflected light through the second reflective layer 70 so the optical modulating device 10 according to the example embodiment may function as a reflective device.

When the first reflective layer 40 has a smaller reflectivity than the second reflective layer 70, and the bottom electrode layer 30 and the substrate 20 may be transparent with respect to a resonance wavelength, and the optical modulating device 10 according to the example embodiment may function as a transmissive meta-device.

In the Fabry-Perot cavity 90 of the phase modulator 100, the tunable core 50 may include a semiconductor material. The tunable core 50 may include the same semiconductor material as the substrate 20, or a different composition may be added thereto. The tunable core 50 may include a quantum well, for example, a multi-quantum well, configured to modulate a phase of light by modulating a refractive index of the tunable core 50 according to electrical control. According to an example embodiment, the Fabry-Perot cavity 90 may include a tunable core 150 (FIG. 6) formed of a bulk semiconductor region.

As described above, the tunable core 50 or 150 may include a multi-quantum well or a bulk semiconductor region, and a refractive index of the tunable core 50 or 150 may be varied through various mechanisms such as quantum-confined stark effects, carrier injection, Pockels effects or temperature control. According to the optical modulating device 10, when a refractive index of the tunable core 50 or 150 satisfying a resonance condition of a cavity is set, reflected light may attain a phase shift of 360 degrees, and a phase shift smaller than 360 degrees may be attained in off-resonance. The Fabry-Perot cavity 90 may or may not resonate by modifying the refractive index of the tunable core 50, thereby obtaining a phase between 0 and 360 degrees.

For example, according to the example embodiment, the tunable core 50 may be formed of a semiconductor material to modulate a refractive index of the tunable core 50 based on electro-optic effects of a multi-quantum well. The tunable core 50 may have a PIN structure, and may be formed using Group III-V semiconductor material. The tunable core 50 may include, for example, a structure in which a multi-quantum well is formed on a gallium arsenide phosphide (GaAsP) barrier by using GaAs and indium gallium arsenide (InGaAs).

Figure 2A:
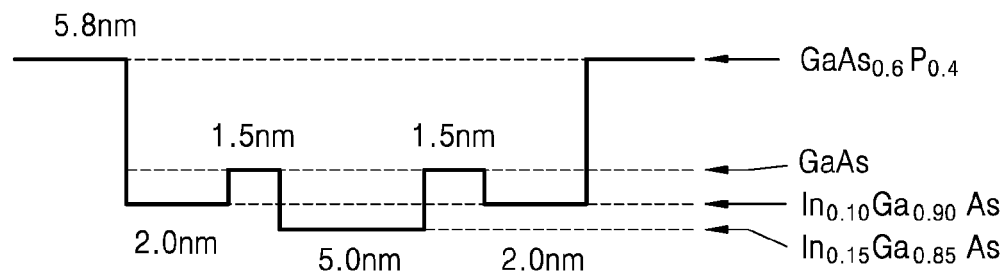
FIG. 2A is a schematic view of a quantum well layer according to an example embodiment.
Figure 2B:
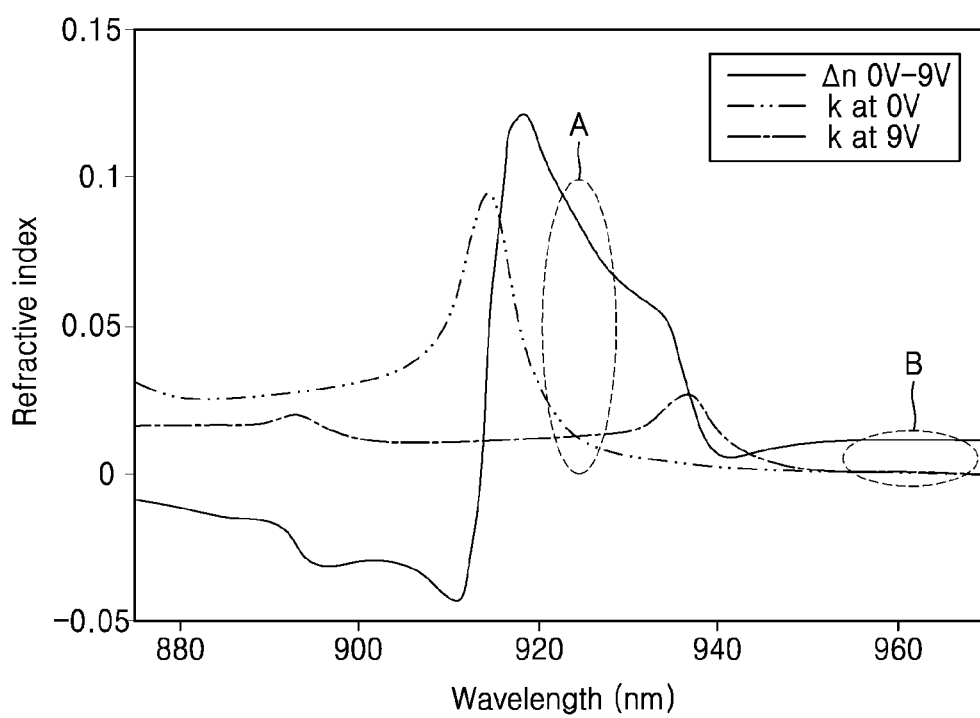
FIG. 2B is a schematic graph showing a variation in a refractive index of a quantum well layer according to wavelengths when voltages of 0 V and 9 V are applied to the quantum well layer of FIG. 2A.

FIG. 2A is a schematic view of a multi-quantum well of the tunable core 50 according to an example embodiment, wherein a thickness, semiconductor material combination, composition, and barrier height of each layer of the multi-quantum well are shown as an example. FIG. 2B is a schematic graph showing a variation in a refractive index of the multi-quantum well of FIG. 2A, to which voltages of 0 V and 9 V are applied.

As illustrated in FIG. 2A, when the tunable core 50 is formed such that a multi-quantum well is formed on a GaAsP barrier using GaAs and InGaAs, when voltages of 0 V and 9 V are applied, the tunable core 50 may have a lower absorption rate and a higher change in a refractive index at a predetermined wavelength, thus allowing higher efficient phase change. In FIG. 2B, when voltages of 0 V and 9 V are applied in a wavelength band of portions indicated by "A" and "B", an absorption rate is lower, and a change $\Delta n$ in a refractive index is higher. Here, the wavelength band with a lower absorption rate and a higher change in a refractive index is not limited to the example of FIG. 2B, and the wavelength band with a lower absorption rate and a greater change in the refractive index may be varied according to a combination and composition of semiconductor materials of respective layers forming the multi-quantum well of the tunable core 50 and a barrier height.

Referring to FIG. 1, the Fabry-Perot cavity 90 of the phase modulator 100 may include a protrusion 80 protruding from the first reflective layer 40, and the protrusion 80 may include the tunable core 50 and the second reflective layer 70.

For example, the protrusion 80 may be formed by stacking layers that form the tunable core 50 and the second reflective layer 70 on the first reflective layer 40, and then by patterning a stack structure of the second reflective layer 70 and the layer forming the tunable core 50 such that the stack structure of the second reflective layer 70 and the tunable core 50 protrudes from the first reflective layer 40.

The second reflective layer 70 may have a size corresponding to the tunable core 50. In this case, the protrusion 80 may be smaller in size than the first reflective layer 40 with respect to each phase modulator 100.

The protrusion 80 may also be formed such that the second reflective layer 70 is smaller than the tunable core 50, or only some layers of the tunable core 50 are patterned. In this case, also, the protrusion 80 may have a smaller size than the first reflective layer 40 with respect to each phase modulator 100.

The protrusion 80 formed by patterning the stack structure of the tunable core 50 and the second reflective layer 70 in a nanostructure as described above may have various sizes of a ½ wavelength or more according to applications. The wavelength refers to a wavelength of light to be modulated by using the phase modulator 100.

Figure 3A:
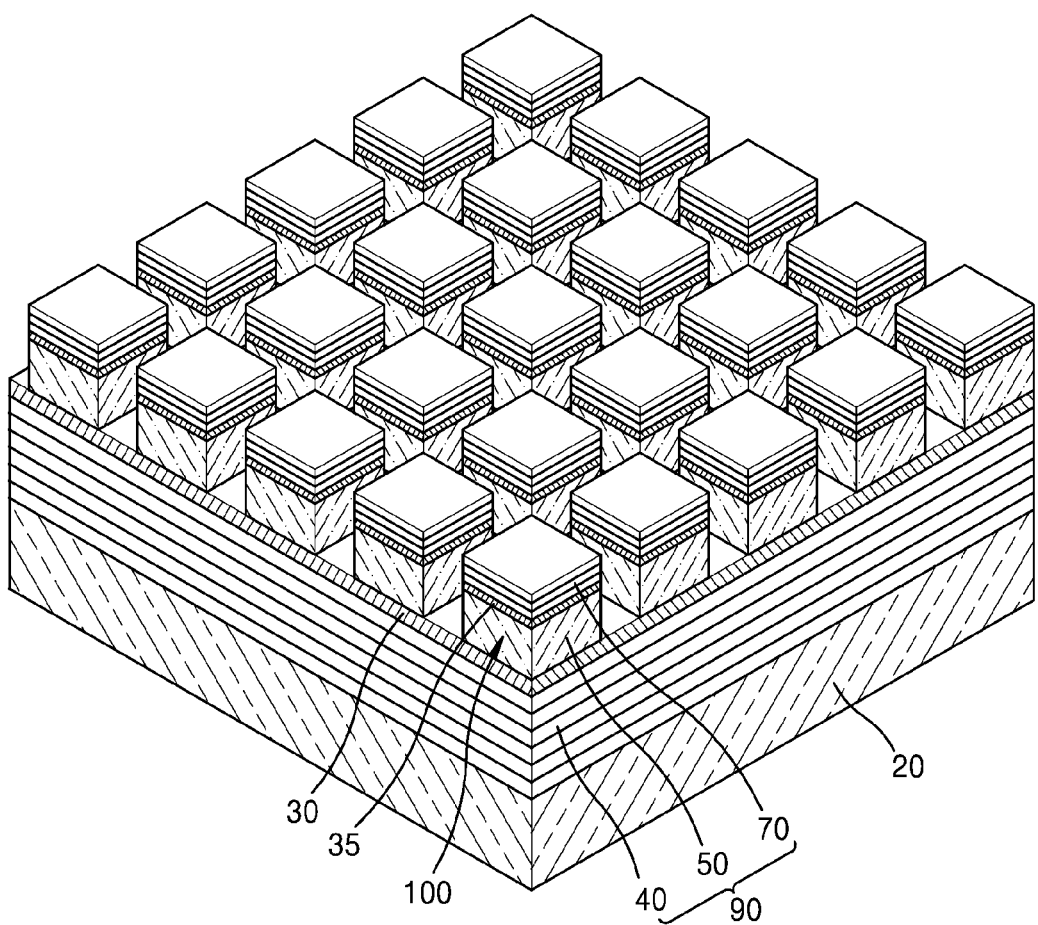
FIG. 3A is an example of the optical modulating device of FIG. 1 implemented as a two-dimensional optical modulating device.
Figure 3B:
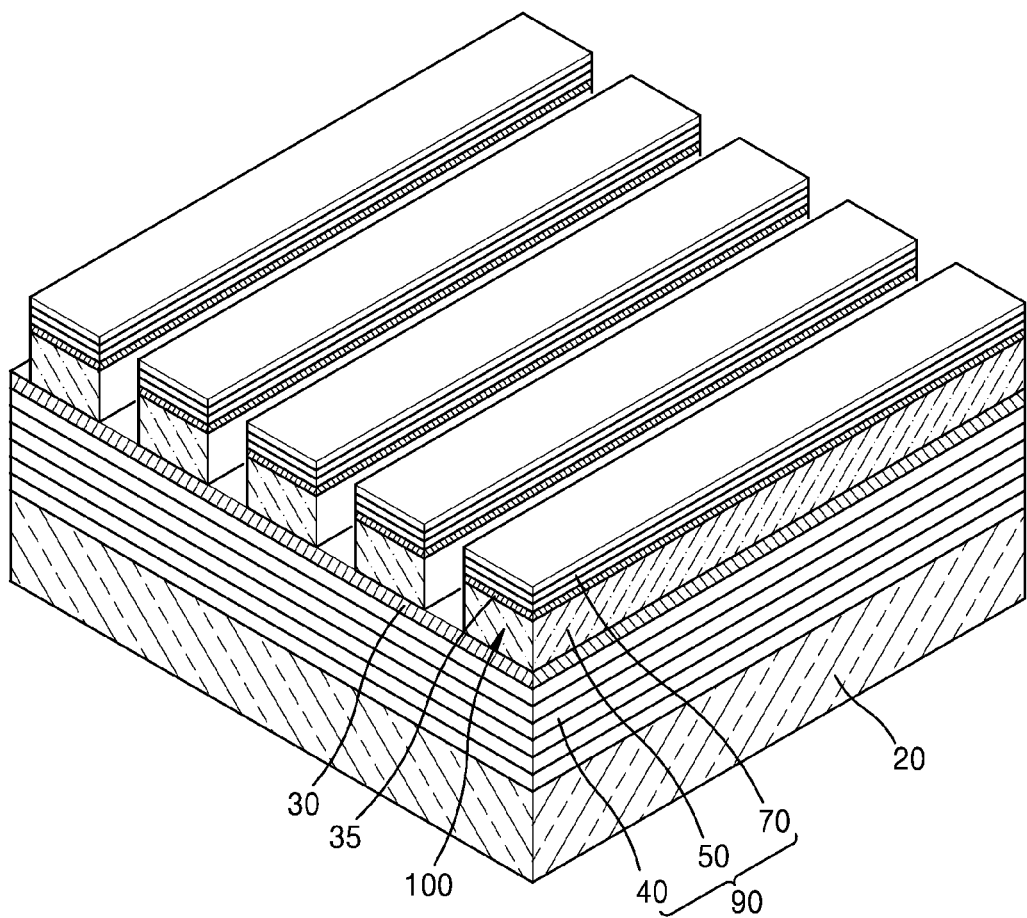
FIG. 3B is an example of the optical modulating device of FIG. 1 implemented as a one-dimensional optical modulating device.

In an example embodiment, the phase modulator 100 may have a structure including only one protrusion 80, and may include only one Fabry-Perot cavity 90, but example embodiments are not limited thereto Meanwhile, as illustrated in FIGS. 3A and 3B, the phase modulator 100 may be formed in a plurality of arrays. For example, after sequentially stacking the first reflective layer 40, the layer of the tunable core 50, and the second reflective layer 70 on the substrate 20, in order to form an array of the phase modulators 100, the stack structure may be patterned from the second reflective layer 70 to the layer of the tunable core 50 to correspond to the arrangement of the array of the phase modulator 100, thereby forming an array of a stack structure of the tunable core 50 and the second reflective layer 70.

That is, according to the optical modulating device 10 according to the example embodiment, each of the plurality of phase modulators 100 may have the protrusion 80 on the first reflective layer 40, and may be formed to be independently controllable. In this case, the bottom electrode layer 30 may be formed as a common electrode or may be formed to correspond to each of the phase modulators 100. A top electrode layer 35 may be formed under the second reflective layer 70 to correspond to each of the phase modulators 100. The top electrode layer 35 may be formed to correspond to the second reflective layer 70 forming each protrusion 80 to modulate a refractive index of the tunable core 50 of the Fabry-Perot cavity 90. A voltage for phase modulation of light according to the modulation of the refractive index of the tunable core 50 may be applied via the top electrode layer 35 and the bottom electrode layer 30. Alternatively, instead of between the first reflective layer 40 and the tunable core 50, the bottom electrode layer 30 may be formed between the substrate 20 and the first reflective layer 40. The top electrode layer 35 may also be formed above the second reflective layer 70.

The plurality of phase modulators 100 may be two-dimensionally arranged as illustrated in FIG. 3A to form a two-dimensional optical modulating device capable of performing two-dimensional phase modulation. Each of the phase modulators 100 may be included in each driving unit. For example, each phase modulator 100 may be arranged in a two-dimensional array in pixel units and addressed by electrodes configured to operate in pixel units, and two-dimensional beam steering may be performed by phase modulation of each phase modulator 100. The top electrode layer 35 may be formed to correspond to the phase modulators 100 on a one-to-one basis to correspond to an arrangement of the phase modulators 100, and the bottom electrode layer 30 formed on the first reflective layer 40 may be formed as a common electrode, or may be formed to correspond to the arrangement of the phase modulators 100. In this case, an incident beam may be two-dimensionally steered by using a two-dimensional optical modulating device.

According to another example embodiment, the plurality of phase modulators 100 may be arranged one-dimensionally as illustrated in FIG. 3B to form a one-dimensional optical modulating device performing one-dimensional phase modulation. In this case, the phase modulator 100 may be included in driving units. For example, each phase modulator 100 may be in a linear shape to form a one-dimensional array, and may be configured to perform one-dimensional steering via phase modulation of each phase modulator 100. The top electrode layer 35 may be formed to correspond to the phase modulators 100 on a one-to-one basis to correspond to the arrangement of the phase modulators 100, and the bottom electrode layer 30 may be formed as a common electrode, or may be formed to correspond to the arrangement of the phase modulators 100. In this case, an incident beam may be one-dimensionally steered using a one-dimensional optical modulating device obtained by one-dimensionally arranging the plurality of phase modulators 100 as illustrated in FIG. 3B.

According to the optical modulating device 10 of the example embodiment as described above, a phase of resonated light may be modulated by modulating a refractive index of the tunable core 50 of the Fabry-Perot cavity 90. A refractive index of the tunable core 50 may be modulated by an applied voltage, and a phase of light may be modulated by modulation of the refractive index of the tunable core 50. In addition, the optical modulating device 10 according to the example embodiment may be monolithically integrated on, for example, a Group III-V semiconductor wafer.

Figure 4:
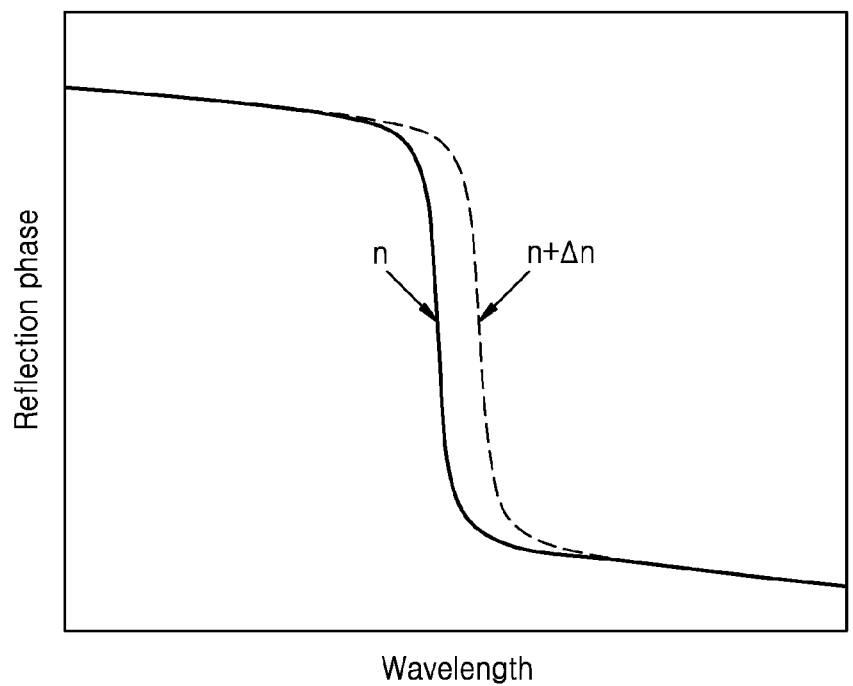
FIG. 4 is a schematic graph of a relationship between refractive index modulation of a tunable core of a Fabry-Perot cavity and a phase change of reflected light according to an example embodiment.

FIG. 4 is a schematic graph of a relationship between refractive index modulation of the tunable core 50 of the Fabry-Perot cavity 90 and a phase change of reflected light.

As shown in FIG. 4, when a refractive index of the tunable core 50 is varied from n to n+$\Delta$n, a phase of reflected light varies at an identical wavelength.

Accordingly, a phase of light reflected by the Fabry-Perot cavity 90 may be shifted by 0 to 360 degrees according to the modulation of a refractive index, and in order to obtain a desired phase response, a refractive index of the tunable core 50 of the Fabry-Perot cavity 90 may be controlled.

When light is incident on the Fabry-Perot cavity 90 of the optical modulating device 10, incident light $E_i e N^{i\psi}$ (shown in FIG. 1) may resonate in the Fabry-Perot cavity 90, and by modulating a refractive index of the tunable core 50 during a resonance process in the Fabry-Perot cavity 90, a phase of the resonated light may be modulated. Accordingly, phase-modulated reflected light $E_r e^{i\varphi}$ may be output from the optical modulating device 10.

Figure 5A:
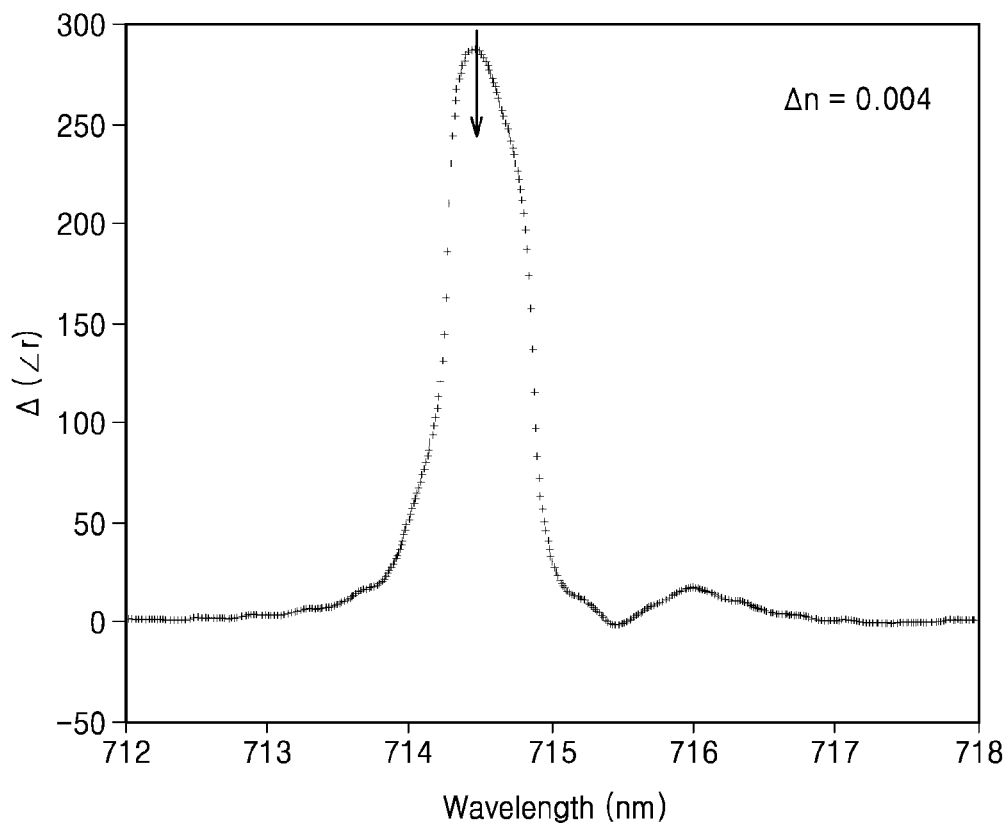
FIGS. 5A and 5B are graphs showing a phase change and reflectivity of a phase-modulated reflected light output from an optical modulating device, according to wavelengths, according to an example embodiment.
Figure 5B:
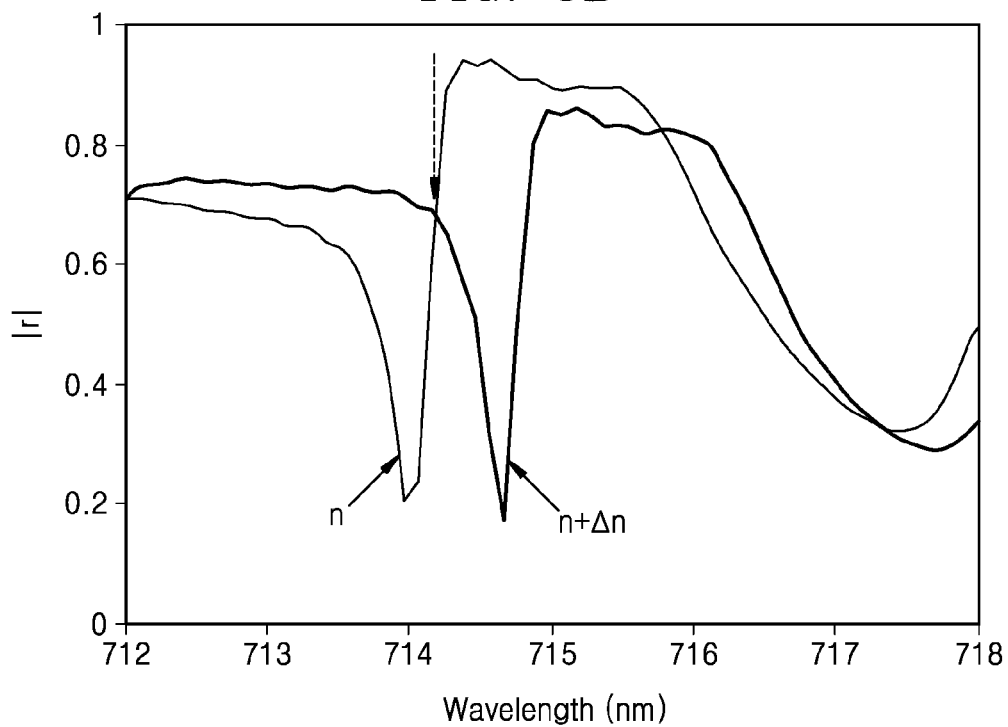

FIGS. 5A and 5B are graphs showing a phase change and reflectivity of a phase-modulated reflected light output from the optical modulating device 10, according to wavelengths, according to an example embodiment.

Referring to FIGS. 5A and 5B, according to the optical modulating device 10 of the example embodiment, at a resonance wavelength near about 714 nm, a phase of light may be modulated by a voltage applied to the tunable core 50 of the Fabry-Perot cavity 90 to be shifted by about 280 degrees, and a reflectivity may be about 0.5, which exhibits a relatively high efficiency. FIGS. 5A and 5B show a larger phase shift value with a higher efficiency and a higher reflectivity, regarding a refractive index variation $\Delta$n of about 0.004. In addition, as shown in FIG. 5A, a large phase shift may occur dominantly in a resonance wavelength portion of the optical modulating device 10 according to the example embodiment, and thus the optical modulating device 10 may have wavelength-selective characteristics.

A reflective relatively high-efficiency and high-phase optical modulating device may be implemented by using the optical modulating device 10 according to the example embodiment as described above.

Figure 6:
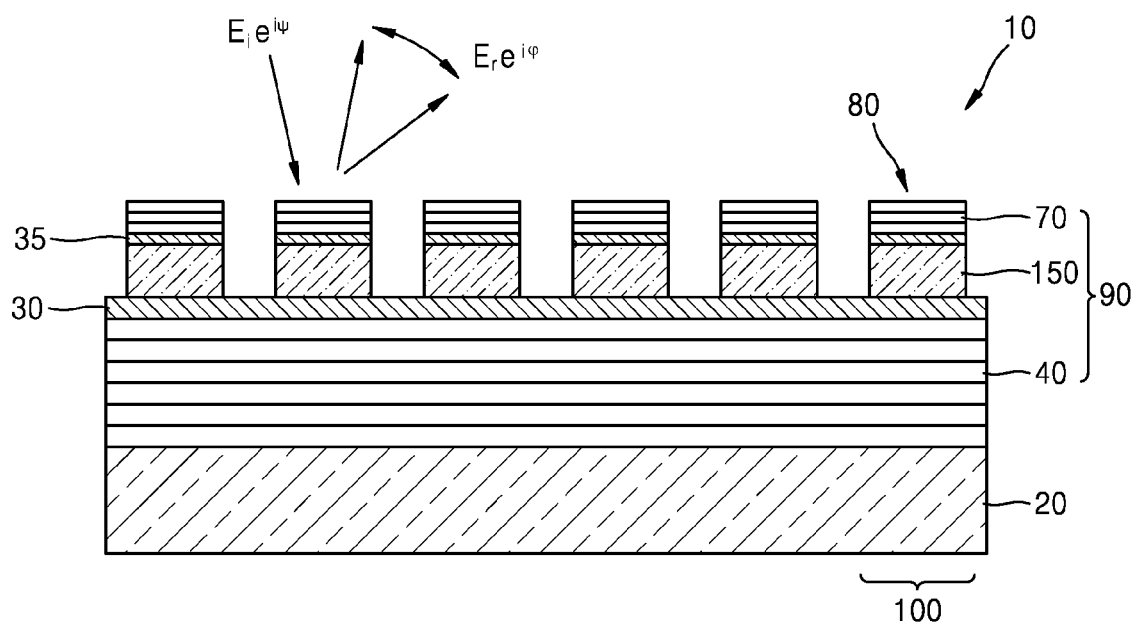
FIGS. 6 and 7 are each a schematic view of an exemplary structure of an optical modulating device according to example embodiments.

FIG. 6 is a schematic view of an exemplary structure of the optical modulating device 10 according to an example embodiment. The optical modulating device 10 of FIG. 6 differs from the optical modulating device 10 of FIG. 1 in terms of the tunable core 150 of the Fabry-Perot cavity 90. Here, substantially identical or similar elements as those in FIG. 1 will be labeled with identical reference numerals.

The semiconductor region of the tunable core 50 in the embodiment of FIG. 1 is formed of a quantum well, for example, a multi-quantum well, whereas the semiconductor region of the tunable core 150 in FIG. 6 may include a bulk semiconductor region. The tunable core 150 may include the same semiconductor material as the substrate, and other compositions may also be added thereto.

Also when the tunable core 150 includes a bulk semiconductor region, a phase of reflected light may be modulated by modulating a refractive index of the tunable core 150 by electrically controlling the tunable core 150.

Figure 7:
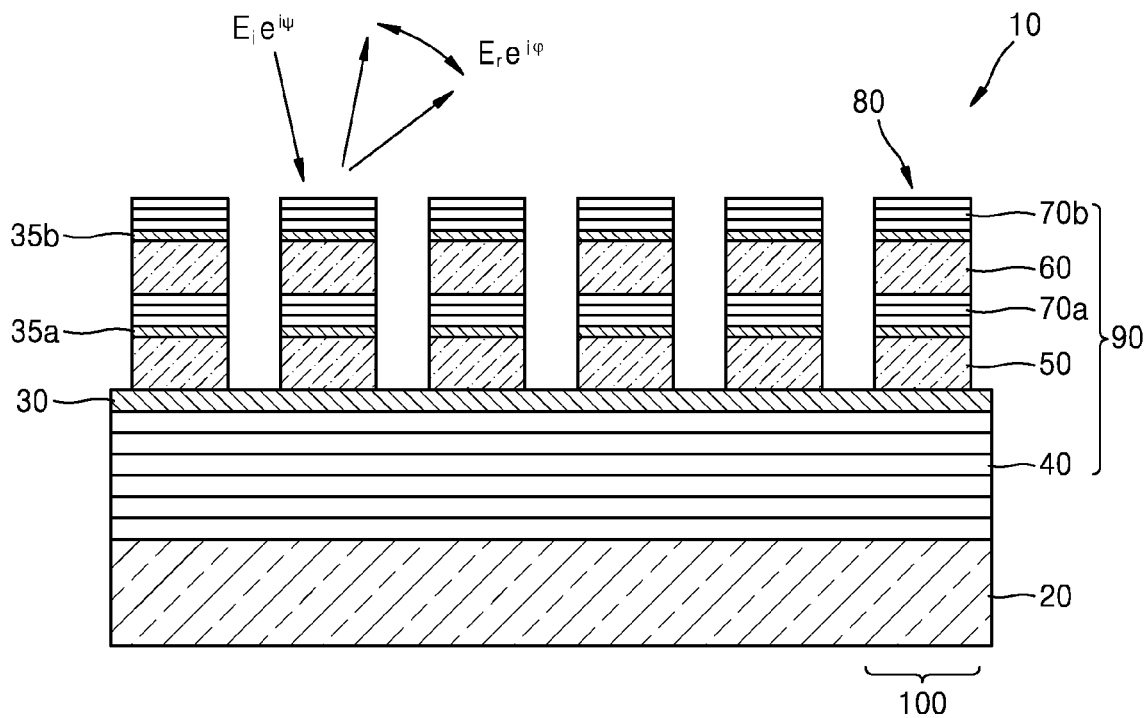

FIG. 7 is a schematic view of an exemplary structure of an optical modulating device 10 according to an example embodiment. Compared with FIG. 1, the optical modulating device 10 of FIG. 7 is different from the optical modulating device 10 of FIG. 1 in that the Fabry-Perot cavity 90 has a dual cavity structure. Here, substantially identical or similar elements as those in FIG. 1 will be labeled with identical reference numerals.

Referring to FIG. 7, the protrusion 80 of the Fabry-Perot cavity 90 according to the example embodiment may include a tunable core 50, a second reflective layer 70a, an additional tunable core 60, and a third reflective layer 70b. That is, according to the example embodiment, the Fabry-Perot cavity 90 may have a dual cavity structure including a first reflective layer 40, a tunable core 50, the second reflective layer 70a, the additional tunable core 60, and the third reflective layer 70b. A top electrode layer 35a may be provided between the tunable core 50 and the second reflective layer 70a, and the top electrode layer 35b may be provided between the additional tunable core 60 and the third reflective layer 70b. One of the top electrode layer 35a and the top electrode layer 35b may be omitted. Also, the top electrode layer 35b may be on the third reflective layer 70b.

Similar to the first reflective layer 40, the second reflective layer 70a and the third reflective layer 70b may include a DBR, and may include less stacked layer than the first reflective layer 40 configured to have a lower reflectivity than the first reflective layer 40.

The additional tunable core 60 may include a quantum well, for example, a multi-quantum well, similar to the tunable core 50. In addition, the tunable core 50 and the additional tunable core 60 may have a bulk semiconductor region.

By forming the Fabry-Perot cavity 90 having a dual cavity structure as described above, a higher reflectivity may be obtained.

When the Fabry-Perot cavity 90 having a dual cavity structure is formed as illustrated in FIG. 7, larger phase tuning of reflected light and stable reflection amplitude may be obtained.

The Fabry-Perot cavity 90 of the example embodiment of FIGS. 6 and 7 may also be applied to the two-dimensional optical modulating device and the one-dimensional optical modulating device described with reference to FIGS. 3A and 3B. Instead of the tunable core 50, the tunable core 150 having a bulk semiconductor region may also be applied to the Fabry-Perot cavity 90 of the example embodiment of FIGS. 6 and 7.

According to the optical modulating device 10 of the example embodiments, as resonance that relies on cavity dimensions of the Fabry-Perot cavity 90 is used, a meta feature that is independent of polarization may be implemented.

In addition, according to the optical modulating device 10 of the example embodiments, the Fabry-Perot cavity 90 may be monolithically integrated to, for example, an on-chip III-V semiconductor component.

Figure 8:
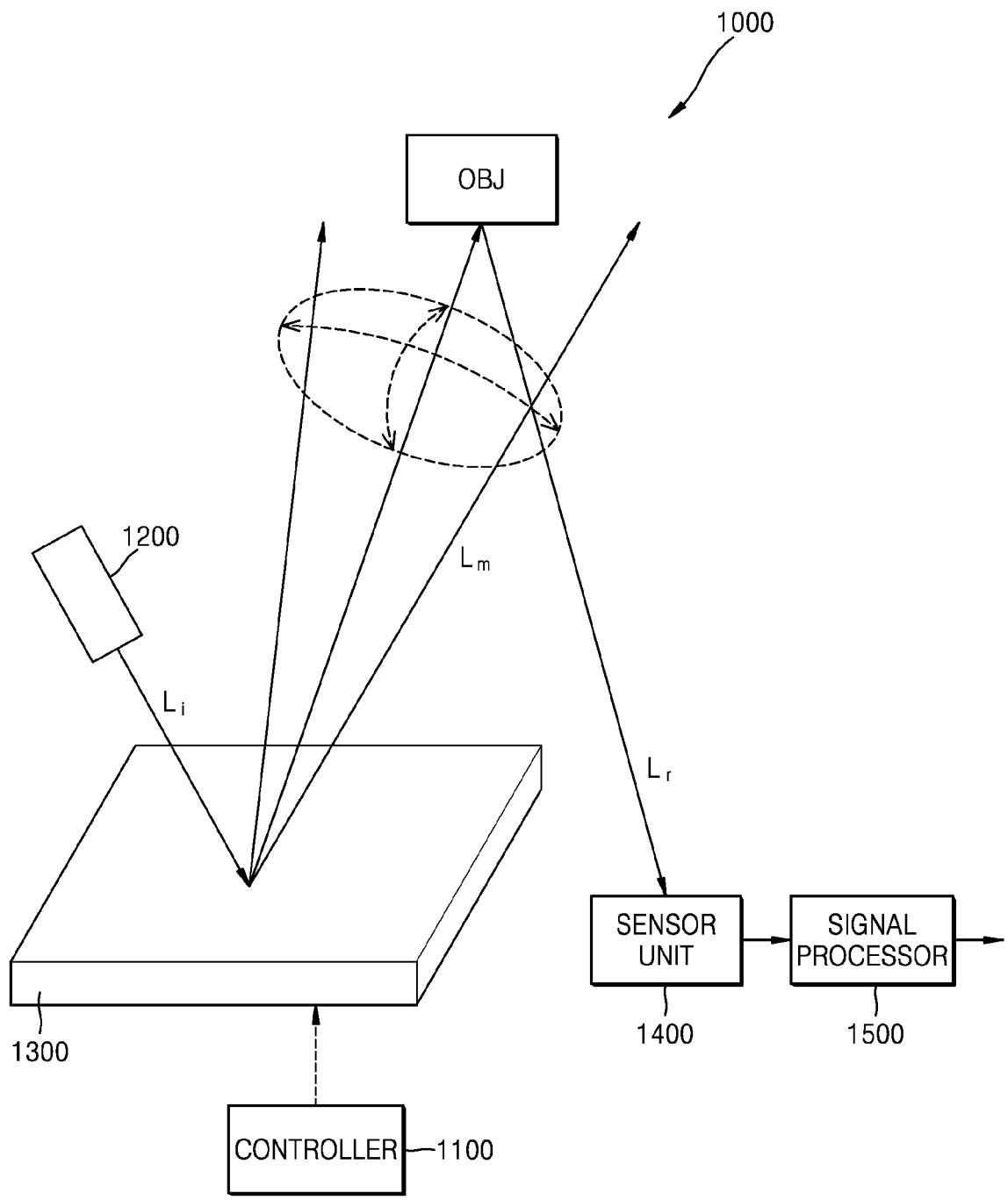
FIG. 8 is a schematic structural block diagram of a light detecting and ranging (LIDAR) system according to an example embodiment.

FIG. 8 is a schematic structural block diagram of a LIDAR system 1000 according to an example embodiment.

Referring to FIG. 8, the LIDAR system 1000 may include a light source unit 1200 from which light is irradiated, a beam steering device 1300 through which light from the light source unit 1200 is steered toward an object OBJ, and a sensor unit 1400 sensing light reflected by the object OBJ.

The LIDAR system 1000 may further include a controller 1100 configured to adjust a phase profile in the beam steering device 1300 and a signal processor 1500 configured to process a signal sensed using the sensor unit 1400. According to an example embodiment, the controller 1100 may be implemented as a processor or may include at least one processor.

The light source unit 1200 may irradiate light to be used in analyzing a location or shape of the object OBJ. The light source unit 1200 may include a light source that generates and irradiates light of a predetermined wavelength. The light source unit 1200 may include a light source that generates and irradiates light of a wavelength suitable for analysis of a location or shape of the object OBJ, for example, infrared light, such as a laser diode (LD), a light-emitting diode (LED), or a super luminescent diode (SLD). The light source unit 1200 may generate and irradiate light of a plurality of different wavelength bands. The light source unit 1200 may generate and irradiate pulse light or continuous light.

The beam steering device 1300 may be configured to steer an incident beam one-dimensionally or two-dimensionally by including the optical modulating device 10 configured to independently modulate a phase of incident light $L_i$ from the light source unit 1200 to steer an incident beam of the incident light $L_i$. The beam steering device 1300 may include the optical modulating device 10 described with reference to FIG. 1 through 7 or an optical modulating device having a form modified based on the optical modulating device 10.

Other optical members, for example, members for adjusting a path of light irradiated from the light source unit 1200 or for wavelength division of light or for additional modulation, may be further disposed between the light source unit 1200 and the beam steering device 1300 and/or between the beam steering device 1300 and the object OBJ.

The controller 1100 may control an input signal input to the optical modulating device 10 included in the beam steering device 1300 such that the beam steering device 1300 has a phase profile for performing a beam steering function. The controller 1100 may also control the beam steering device 1300 such that an object is scanned as a steering direction of the beam steering device 1300 is time-sequentially adjusted. The beam steering device 1300 may perform beam steering in a one-dimensional or two-dimensional direction, and thus, may scan an object OBJ in a one-dimensional or two-dimensional direction. Incident light Li provided by the light source unit 1200 may be modulated by using the beam steering device 1300 to be modulated light Lm, and while the modulated light Lm scans the object OBJ in a two-dimensional direction, light Lr reflected by the object OBJ may be sensed by using the sensor unit 1400. A sensed optical signal may be transmitted to the signal processor 1500 and used in analyzing whether the object OBJ exists or a location or shape of the object OBJ.

The sensor unit 1400 may include an array of a plurality of sensors used to detect light reflected by the object OBJ. The sensor unit 1400 may include arrays of sensors sensing light of a plurality of different wavelengths.

The signal processor 1500 may perform a predetermined calculation based on the optical signal detected using the sensor unit 1400, for example, a calculation to measure time of flight and may determine a three-dimensional shape of an object OBJ based on the measured time of flight. The signal processor 1500 may use various calculation methods. For example, a direct time measuring method includes may include projecting pulse light onto an object OBJ and measuring the return time of light after being reflected by the object OBJ by using a timer to obtain a distance. In a correlation method, pulse light is projected onto an object OBJ, and a distance is measured based on brightness of light returning after being reflected by the object OBJ. In a phase delay measurement method, light of a continuous wave such as a sine wave is projected onto an object OBJ, and a phase difference of reflected light returning after being reflected by the object OBJ is sensed to be converted into a distance. The signal processor 1500 may include memory storing programs and other types of data needed for this calculation.

The signal processor 1500 may transmit a calculation result, that is, information about a shape, location, or the like of the object OBJ to another unit. For example, the information may be transmitted to a driving controller of an autonomous driver or a warning system in which the LIDAR system 1000 is included.

The LIDAR system 1000 may be used as a sensor for acquiring three-dimensional information about front objects in real time, and may be applicable to, for example, an autonomous driver such as a driverless car, an autonomous vehicle, robots, or drones. The LIDAR system 1000 may also be applied to not only autonomous drivers but also black boxes in detecting obstacles at the front and at the back during the night when it is difficult to identify objects only by using an image sensor.

The optical modulating device of the example embodiments and the system including the same may include a phase modulator including a Fabry-Perot cavity, and a phase of light may be modulated by modulating a refractive index of a tunable core that is provided between a first reflective layer and a second reflective layer of the Fabry-Perot cavity, and formed of a semiconductor region according to electrical control of the tunable core, and thus, a relatively highly efficient and high-phase optical modulating device may be implemented.

It should be understood that example embodiments described herein should be considered in a descriptive sense only and not for purposes of limitation.

While one or more embodiments have been described with reference to the figures, it will be understood by those of ordinary skill in the art that various changes in form and details may be made therein without departing from the spirit and scope of the present disclosure as defined by the following claims and their equivalents.

What is claimed is:

1. An optical modulating device comprising:
    a substrate; and
    a plurality of phase modulators formed on the substrate and respectively comprising a Fabry-Perot cavity,
    wherein the Fabry-Perot cavity of each of the plurality of phase modulators comprises:
        a first reflective layer;
        a second reflective layer; and
        a tunable core formed between the first reflective layer and the second reflective layer;
    wherein light is incident on the second reflective layer and the incident light is resonated in the Fabry-Perot cavity,
    wherein the tunable core is formed of a semiconductor material and is configured to modulate a phase of the resonated light based on modulation of a refractive index of the tunable core by electrical control of the tunable core,
    wherein the optical modulating device further comprises a common electrode between the first reflective layer and the tunable core, and a first top electrode between the tunable core and the second reflective layer,
    wherein a reflectivity of the second reflective layer is less than a reflectively of the first reflective layer, and a number of stacks of the second reflective layer is less than a number of stacks of the first reflective layer,
    wherein a phase-modulated reflected light in the Fabry-Perot cavity is output from the second reflective layer, and
    wherein the plurality of phase modulators respectively extend in a first direction along a width of the substrate and are arranged in a plurality of rows spaced apart from each other in a second direction perpendicular to the first direction, the plurality of phase modulators respectively extending in the first direction longer than the second direction and being configured to steer incident light in only one direction.

2. The optical modulating device of claim 1, wherein the tunable core comprises a quantum well configured to modulate a phase of light based on the modulation of the refractive index of the tunable core by electrical control.

3. The optical modulating device of claim 2, wherein the tunable core comprises a multi-quantum well.

4. The optical modulating device of claim 3, wherein the multi-quantum well comprises a Group III-V semiconductor.

5. The optical modulating device of claim 1, wherein the tunable core comprises a bulk semiconductor region configured to modulate a phase of light based on the modulation of the refractive index of the tunable core by electrical control.

6. The optical modulating device of claim 1, wherein at least one from among the first reflective layer and the second reflective layer comprises a distributed Bragg reflector.

7. The optical modulating device of claim 6, wherein the distributed Bragg reflector of the at least one from among the first reflective layer and the second reflective layer comprises a dielectric material, and the Fabry-Perot cavity forms a dielectric tunable core.

8. The optical modulating device of claim 1, wherein the substrate, the first reflective layer, the common electrode, the tunable core, and the second reflective layer are provided in that order, and
    the Fabry-Perot cavity comprises a protrusion protruding from the common electrode, the protrusion comprising the tunable core and the second reflective layer.

9. The optical modulating device of claim 8, wherein the second reflective layer has a size corresponding to the tunable core.

10. The optical modulating device of claim 8, wherein the protrusion comprises a plurality of protrusions spaced apart from each other.

11. A light detecting and ranging (LIDAR) apparatus comprising:
    a light source configured to emit light;
    the optical modulating device of claim 1, the optical modulating device that is irradiated by the light emitted from the light source and configured to steer the light irradiated from the light source toward an object; and
    a sensor configured to receive light that is steered by the optical modulating device toward the object and reflected by the object.

12. The LIDAR apparatus of claim 11, wherein the tunable core comprises a quantum well or a bulk semiconductor region that is formed using a Group III-V semiconductor and is configured to modulate a phase of light based on the modulation of the refractive index of the tunable core by electrical control.

13. The LIDAR apparatus of claim 11, wherein at least one from among the first reflective layer and the second reflective layer comprises a distributed Bragg reflector,
    wherein the distributed Bragg reflector comprises a dielectric material,
    wherein the Fabry-Perot cavity forms a dielectric tunable core.

14. The LIDAR apparatus of claim 11, wherein the substrate, the first reflective layer, the common electrode, the tunable core, and the second reflective layer are provided in that order, and
    the Fabry-Perot cavity comprises a protrusion protruding from the common electrode, the protrusion comprising the tunable core and the second reflective layer.

15. The LIDAR apparatus of claim 14, wherein the protrusion further comprises:
    an additional tunable core formed on the second reflective layer; and
    a third reflective layer formed on the additional tunable core;

wherein the Fabry-Perot cavity has a dual cavity structure, and wherein a reflectivity of the third reflective layer is less than the first reflective layer, and a number of stacks of the third reflective layer is less than a number of stacks of the first reflective layer.

* * * * *